(12) United States Patent
Wakamatsu

(10) Patent No.: US 7,905,141 B2
(45) Date of Patent: Mar. 15, 2011

(54) PATH STRUCTURE RELATED TO FLOW OF FLUID TO BE MEASURED AND PRESSURE DIFFERENCE DETECTION IN SERVO TYPE VOLUMETRIC FLOWMETER

(75) Inventor: Takeshi Wakamatsu, Tokyo (JP)

(73) Assignee: Oval Corporation, Tokyo (JP)

( * ) Notice: Subject to any disclaimer, the term of this patent is extended or adjusted under 35 U.S.C. 154(b) by 143 days.

(21) Appl. No.: 12/521,792

(22) PCT Filed: Jan. 25, 2008

(86) PCT No.: PCT/JP2008/051604
§ 371 (c)(1),
(2), (4) Date: Jun. 30, 2009

(87) PCT Pub. No.: WO2008/096665
PCT Pub. Date: Aug. 14, 2008

(65) Prior Publication Data
US 2010/0037705 A1 Feb. 18, 2010

(30) Foreign Application Priority Data
Feb. 5, 2007 (JP) ................. 2007-025187

(51) Int. Cl.
G01F 3/14 (2006.01)
G01F 1/34 (2006.01)

(52) U.S. Cl. ........................ 73/239; 73/861.42

(58) Field of Classification Search ............... None
See application file for complete search history.

(56) References Cited

U.S. PATENT DOCUMENTS

| | | | | |
|---|---|---|---|---|
| 2,809,492 A * | 10/1957 | Arkawy | ............. | 60/39.281 |
| 3,015,233 A * | 1/1962 | Frederick et al. | ............. | 73/861.59 |
| 3,266,309 A * | 8/1966 | Bernard et al. | ............. | 73/861.59 |
| 3,699,812 A * | 10/1972 | Masnik | ............. | 73/861.59 |
| 4,062,236 A * | 12/1977 | Clingman, Jr. | ............. | 374/37 |
| 4,125,018 A * | 11/1978 | Clingman, Jr. | ............. | 374/37 |
| 4,627,267 A * | 12/1986 | Cohrs et al. | ............. | 73/1.22 |
| 5,284,053 A * | 2/1994 | Wadlow et al. | ............. | 73/199 |
| 2008/0163931 A1* | 7/2008 | Brocard et al. | ............. | 137/10 |
| 2010/0043568 A1* | 2/2010 | Wakamatsu | ............. | 73/861.81 |

FOREIGN PATENT DOCUMENTS

| | | |
|---|---|---|
| JP | 63-148831 | 9/1988 |
| JP | 2-124430 | 5/1990 |
| JP | 4-294211 | 10/1992 |
| JP | 3331212 | 5/2002 |
| JP | 2002156257 A * | 5/2002 |

OTHER PUBLICATIONS

International Search Report mailed Apr. 1, 2008 for International Application No. PCT/JP2008/051604.

\* cited by examiner

*Primary Examiner* — Harshad Patel
(74) *Attorney, Agent, or Firm* — Wenderoth, Lind & Ponack, L.L.P.

(57) ABSTRACT

One pressure difference detection connecting path (71) and another pressure difference detection connecting path (72) are formed so as to be arranged at a predetermined interval in a longitudinal direction. Further, the one pressure difference detection connecting path (71) is formed so as to be connected in front of a continuation center position (70) of a second inflow path (67) and a first inflow path (43). Further, the other pressure difference detection connecting path (72) is formed so as to be connected behind a continuation center position (69) of a second outflow path (66) and a first outflow path (44).

2 Claims, 15 Drawing Sheets

PATH STRUCTURE RELATED TO FLOW OF FLUID TO BE MEASURED AND PRESSURE DIFFERENCE DETECTION IN SERVO TYPE VOLUMETRIC FLOWMETER

TECHNICAL FIELD

The present invention relates to a servo type volumetric flowmeter, and more specifically, to a path structure related to a flow of a fluid to be measured and pressure difference detection in this servo type volumetric flowmeter.

BACKGROUND ART

As one of its components, a volumetric flowmeter has a pump portion. The pump portion is equipped with a measuring chamber provided in a flow path and a pair of rotors causing a fixed volume of fluid to flow out for each rotation in the measuring chamber. The volumetric flowmeter can measure flow rate from rotation of the rotors. More specifically, the volume defined by the measuring chamber and the rotors is regarded as a reference volume, and it is possible to obtain flow rate from the rpm of the rotors while discharging fluid flowing into the measuring chamber according to the rotation of the rotors.

Owing to a capability of direct measurement of volume flow rate and high accuracy thereof, the volumetric flowmeter is widely used as a flowmeter for industrial and transaction uses.

As a volumetric flowmeter which accurately detects the pressure loss between the outlet and inlet of the flowmeter in order that stable flow rate measurement may be effected without being influenced by the physical values of the fluid, such as viscosity and density, and which imparts drive force from the outside to the rotors so as to keep the pressure loss at zero, making it possible to measure the flow rate at this time from the operational rpm of the rotors, there is known a servo type volumetric flowmeter as disclosed in Japanese Patent No. 3,331,212.

DISCLOSURE OF THE INVENTION

The above-mentioned conventional servo type volumetric flowmeter, which is structured and constructed to detect a pressure difference between the outflow and inflow ports, has a problem in that it cannot perform detection with high precision since the pressure difference detecting position is relatively away from the metering chamber (which is a problem not restricted to the positive displacement flowmeter of JP 3331212 B).

Further, due to the structure in which the differential pressure gage is installed at a position away from the casing having the metering chamber and in which pressure is extracted from the casing by using a connecting tube, a deterioration in responsiveness is to be concerned, which means detection with high precision is impossible (which is a problem not restricted to the positive displacement flowmeter of JP 3331212 B). Further, since the differential pressure gage is installed at a position away from the casing, the size of the positive displacement flowmeter becomes rather large.

The present invention has been made in view of the above-mentioned problems in the prior art. It is an object of the present invention to provide a path structure related to a flow of a fluid to be measured and pressure difference detection in a servo type volumetric flowmeter which helps to achieve an improvement in terms of precision in pressure difference detection and to achieve a reduction in size.

A path structure related to a flow of a fluid to be measured and pressure difference detection in a servo type volumetric flowmeter according to Claim 1 of the present invention, which has been made for solving the above-mentioned problems, is characterized by including: assuming that an axial direction of a rotor shaft is a longitudinal direction, an outflow port for the fluid to be measured and an inflow port for the fluid to be measured formed in a metering chamber so as to be above and below, respectively, an engagement portion of a first rotor and a second rotor having this rotor shaft; a first outflow path extending in the axial direction formed in a main body casing so as to be continuous with the outflow port for the fluid to be measured situated on an upper side; a first inflow path extending in the axial direction formed in the main body casing so as to be continuous with the inflow port for the fluid to be measured situated on a lower side; a second outflow path extending in an orthogonal direction to the axial direction formed in the main body casing so as to be continuous with the first outflow path of the first outflow path and the first inflow path, which are parallel to each other; a second inflow path extending in the orthogonal direction so as to be continuous with the first inflow path and parallel to the second outflow path formed in the main body casing; one pressure difference detection connecting path formed in the main body casing, one end of which is open to the first inflow path at a position between a continuation center position of the first inflow path and the second inflow path and the inflow port for the fluid to be measured, and which extends so as not to overlap the second inflow path; another pressure difference detection connecting path formed in the main body casing, one end of which is open to the first outflow path at a position farther away from the outflow port for the fluid to be measured with respect to a continuation center position of the first outflow path and the second outflow path, which extends so as not to overlap the second outflow path, and which is parallel to the one pressure difference detection connecting path; and a pressure difference detecting portion formed in the main body casing so as to be continuous with the other end of the one pressure difference detection connecting path and with the other end of the other pressure difference detection connecting path.

A path structure related to a flow of a fluid to be measured and pressure difference detection in a servo type volumetric flowmeter according to Claim 2 of the present invention, in the path structure related to a flow of a fluid to be measured and pressure difference detection in a servo type volumetric flowmeter according to Claim 2 of the invention, is characterized in that the second outflow path and the second inflow path are formed so as to extend to left or to right; and the one pressure difference detection connecting path and the other pressure difference detection connecting path are formed so as to extend downwards or upwards.

According to the present invention, which has the above-mentioned features, the position where pressure difference is extracted is close to the pump portion. Thus, it is possible to achieve an enhancement in accuracy in pressure difference detection. Further, there is provided a servo type volumetric flowmeter of a structure in which the means for detecting pressure difference is integrated with the main body casing. Thus, the position where the pressure difference is detected is closer to the pump portion, with the result that it is possible to achieve a further enhancement in accuracy in pressure difference detection.

According to the present invention, the inflow path and the outflow path for the fluid to be measured are formed as parallel paths, with the vertical distance of the rotor engagement portion being maintained. Those paths are formed as L-shaped paths. Further, the paths related to pressure difference detection extending from those paths are also formed as parallel paths extending in a direction orthogonal to the axial direction of the rotor shaft. Thus, according to the present invention, it is possible to shorten the positive displacement flowmeter itself in the axial direction of the rotor shaft.

According to the present invention, it is possible to achieve a marked improvement over the prior art in terms of precision in pressure difference detection. Further, it is possible to achieve a reduction in the size of a servo type volumetric flowmeter.

BRIEF DESCRIPTION OF THE DRAWINGS

FIG. 13 is a view as seen in the direction of the arrow A of FIG. 10.

BEST MODE FOR CARRYING OUT THE INVENTION

Figure 1:
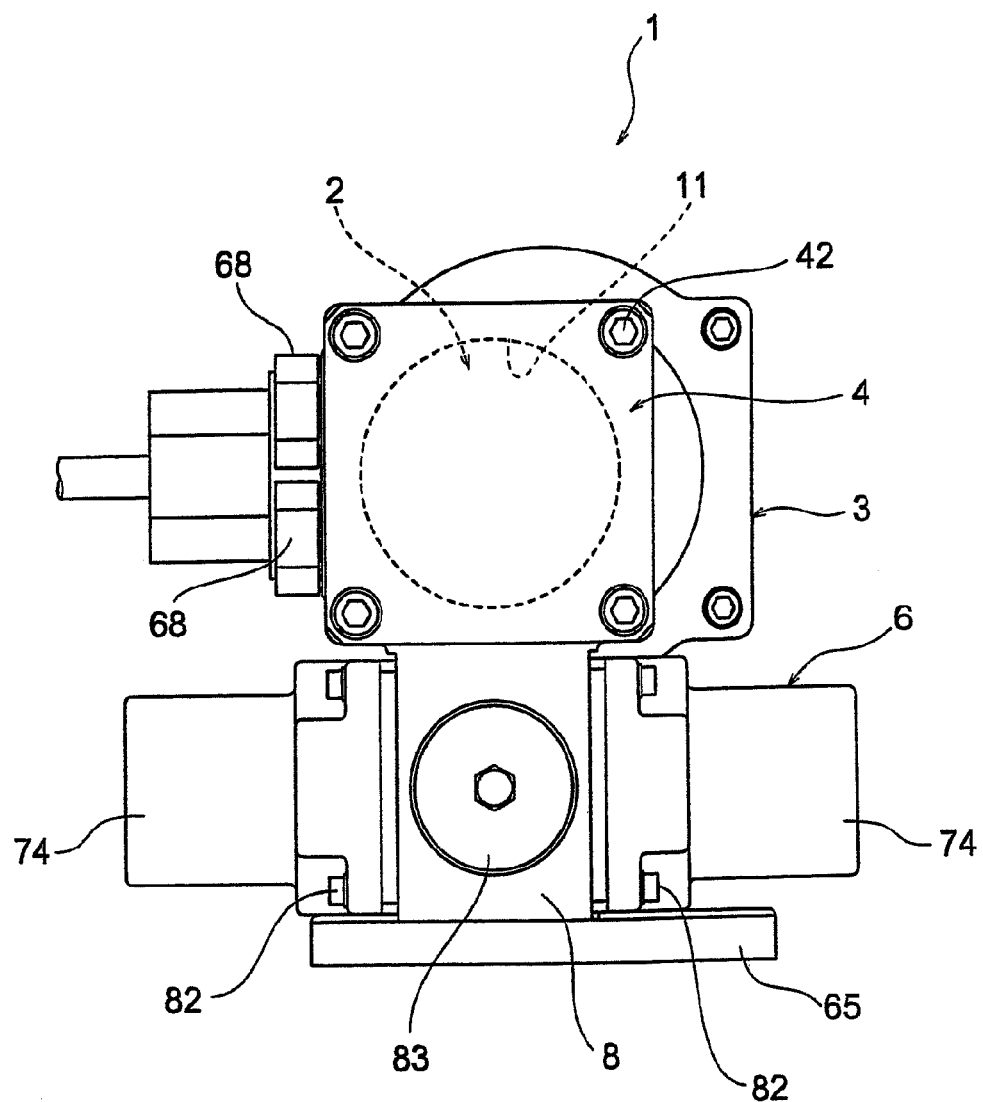
FIG. 1 is a front view of a servo type volumetric flowmeter according to an embodiment of the present invention.
Figure 2:
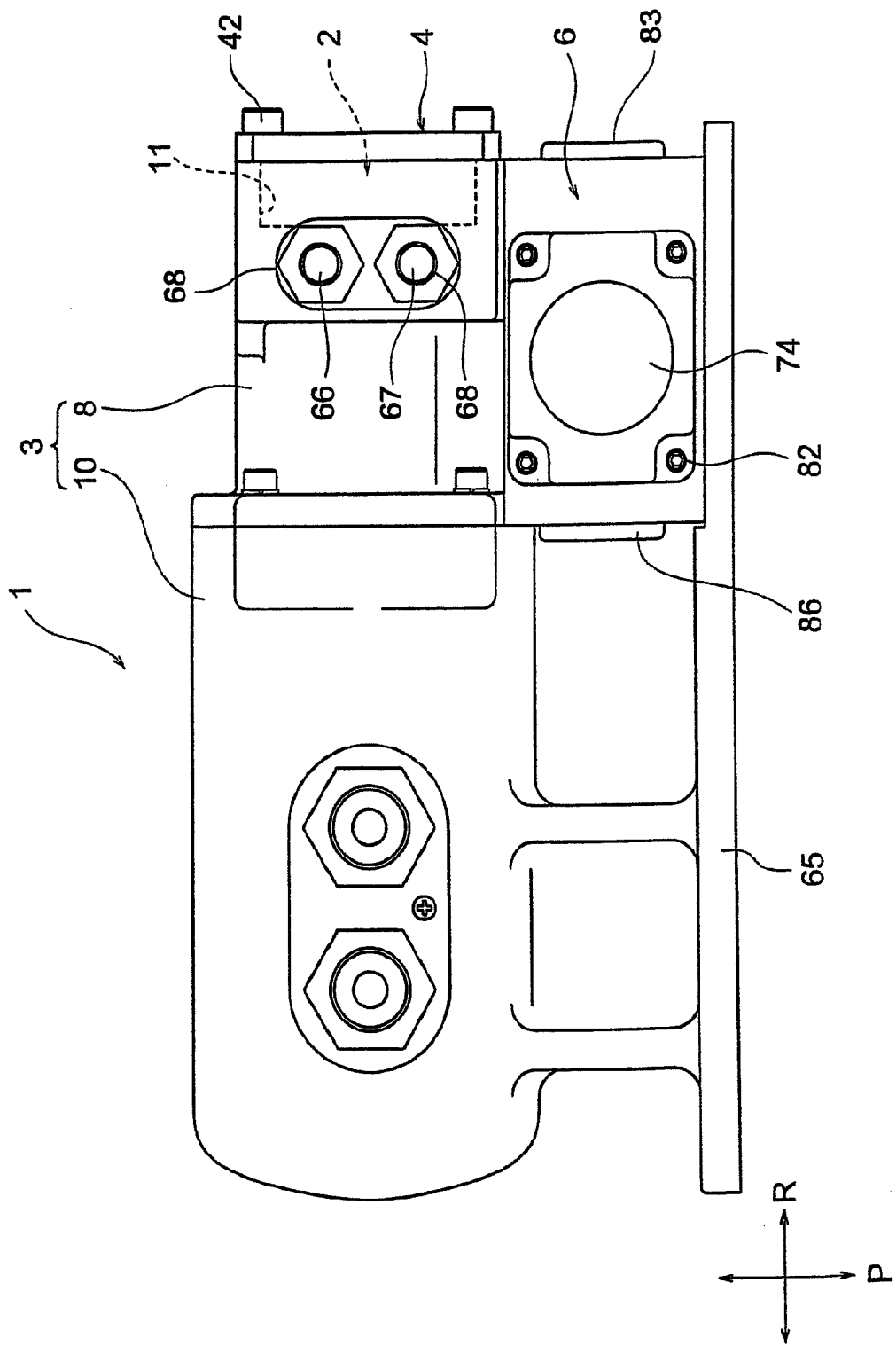
FIG. 2 is a left-hand side view of the servo type volumetric flowmeter.
Figure 4:
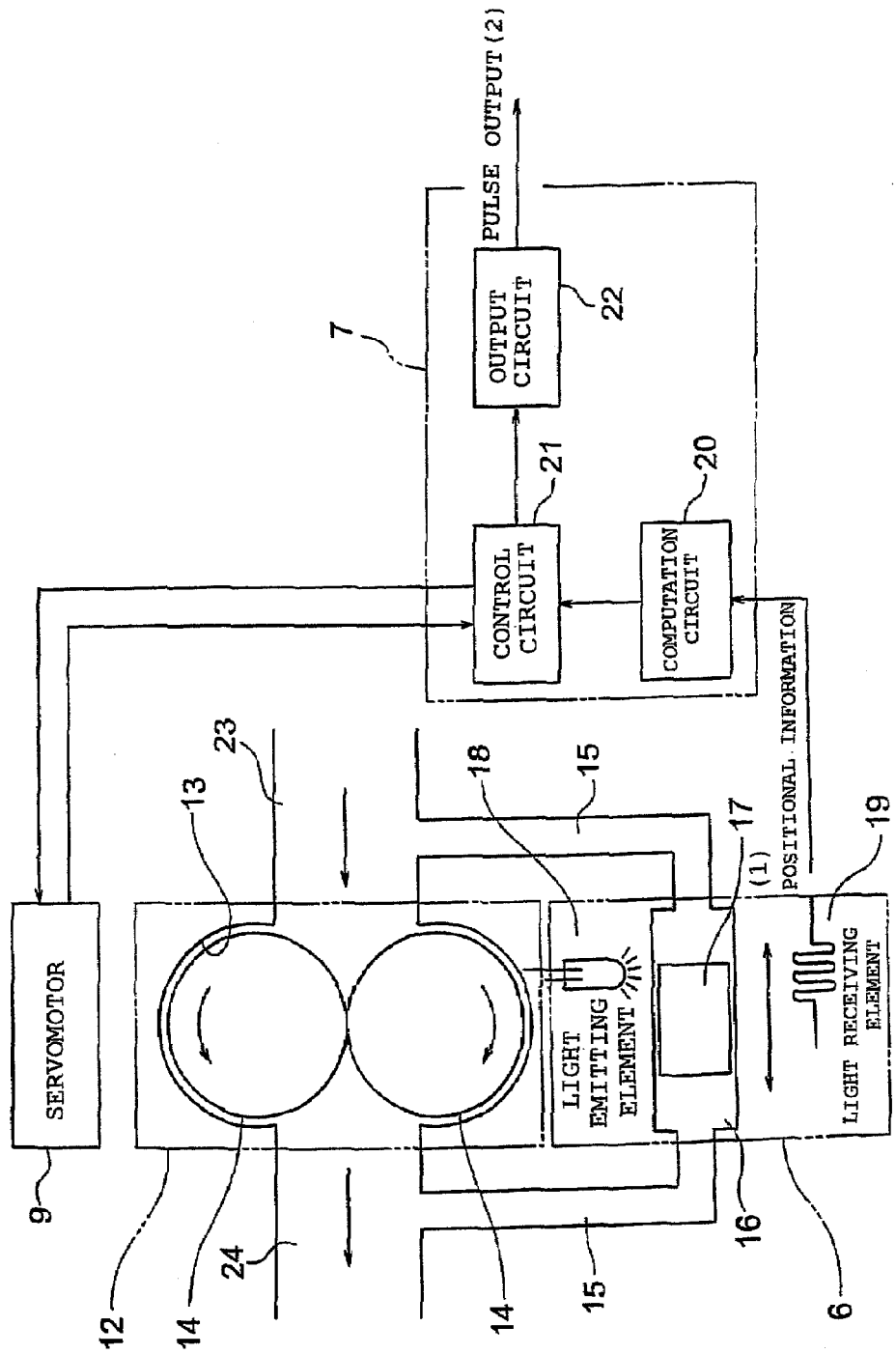
FIG. 4 is a diagram showing a system configuration.
Figure 5:
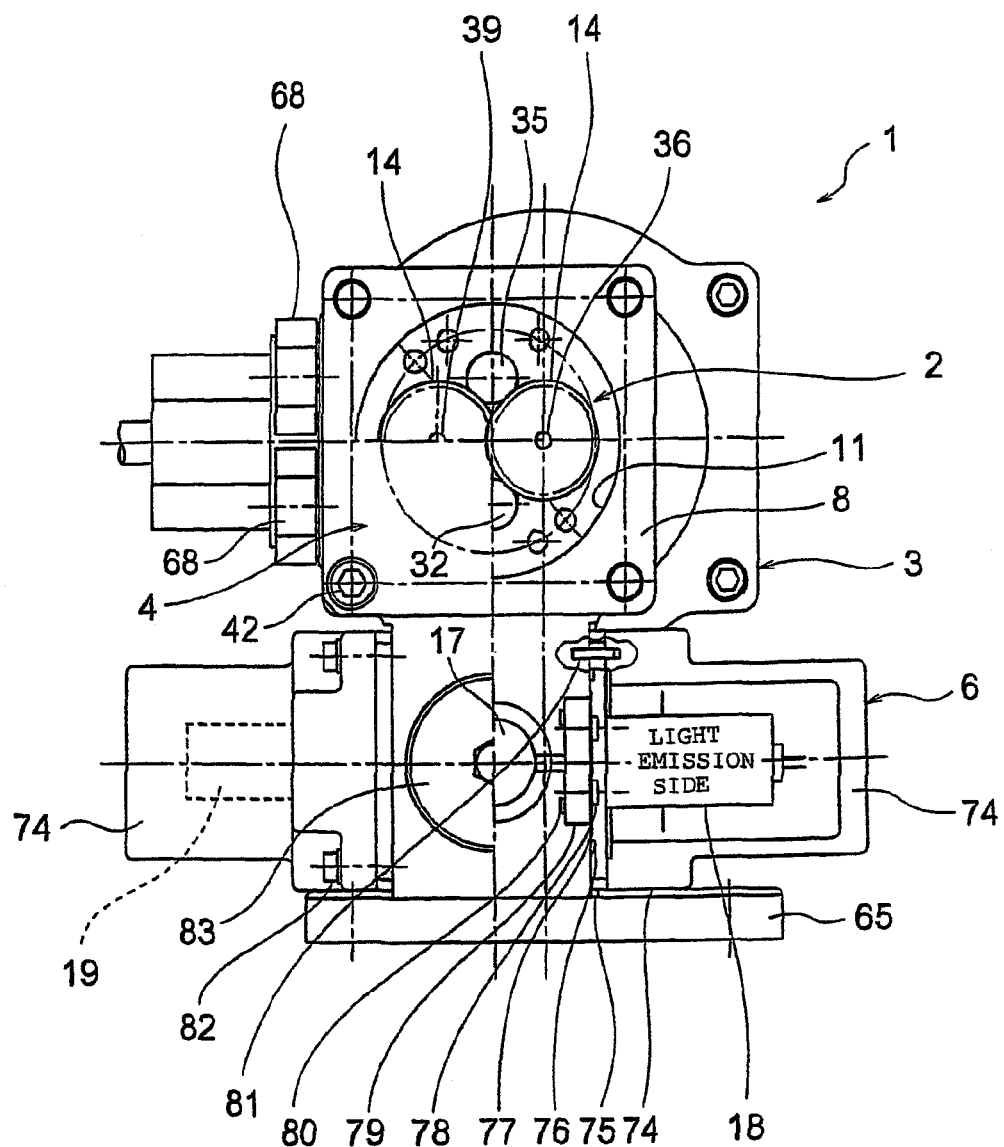
FIG. 5 is an explanatory structural view as seen from the front side.
Figure 6:
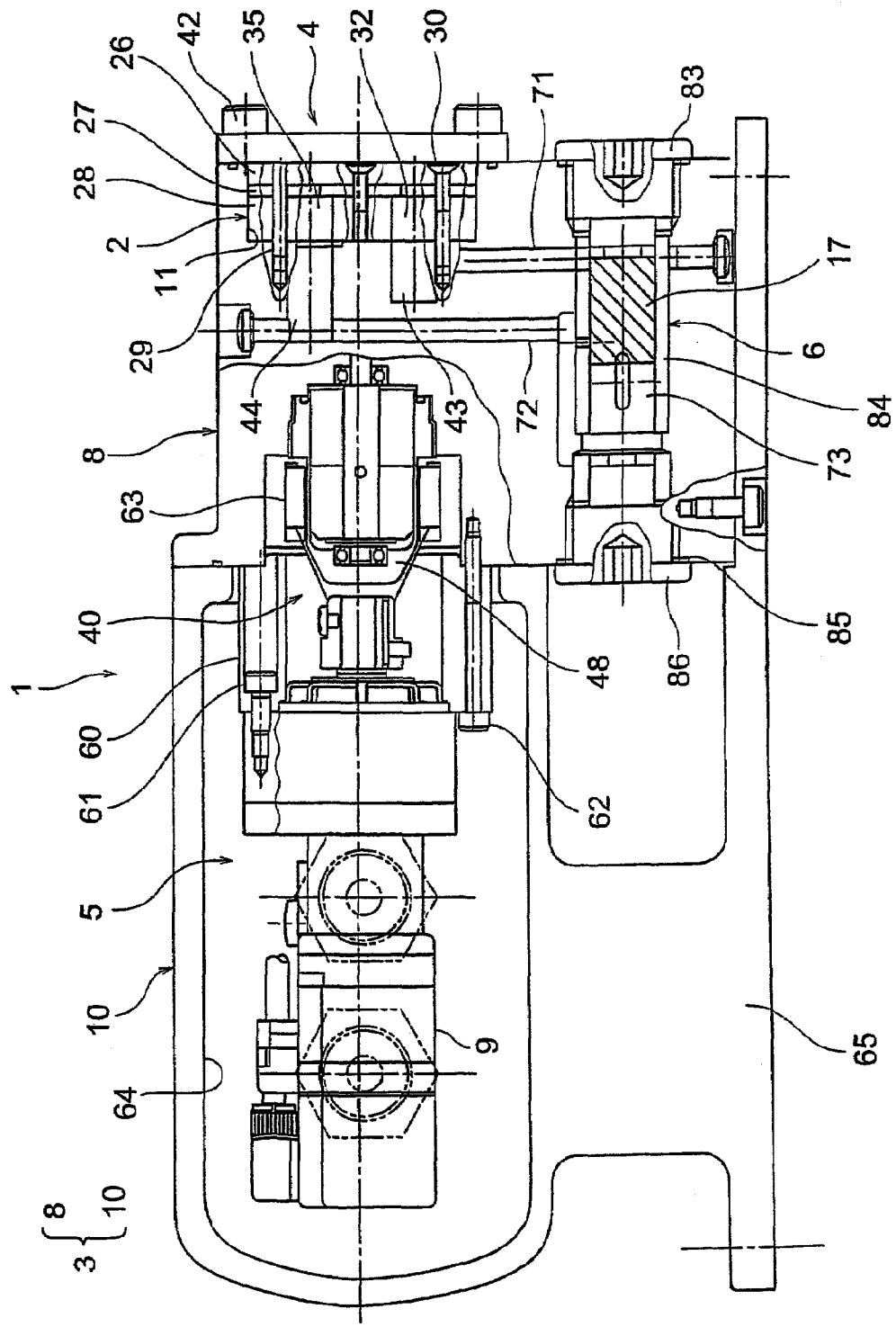
FIG. 6 is an explanatory structural view as seen from the left-hand side.
Figure 7:
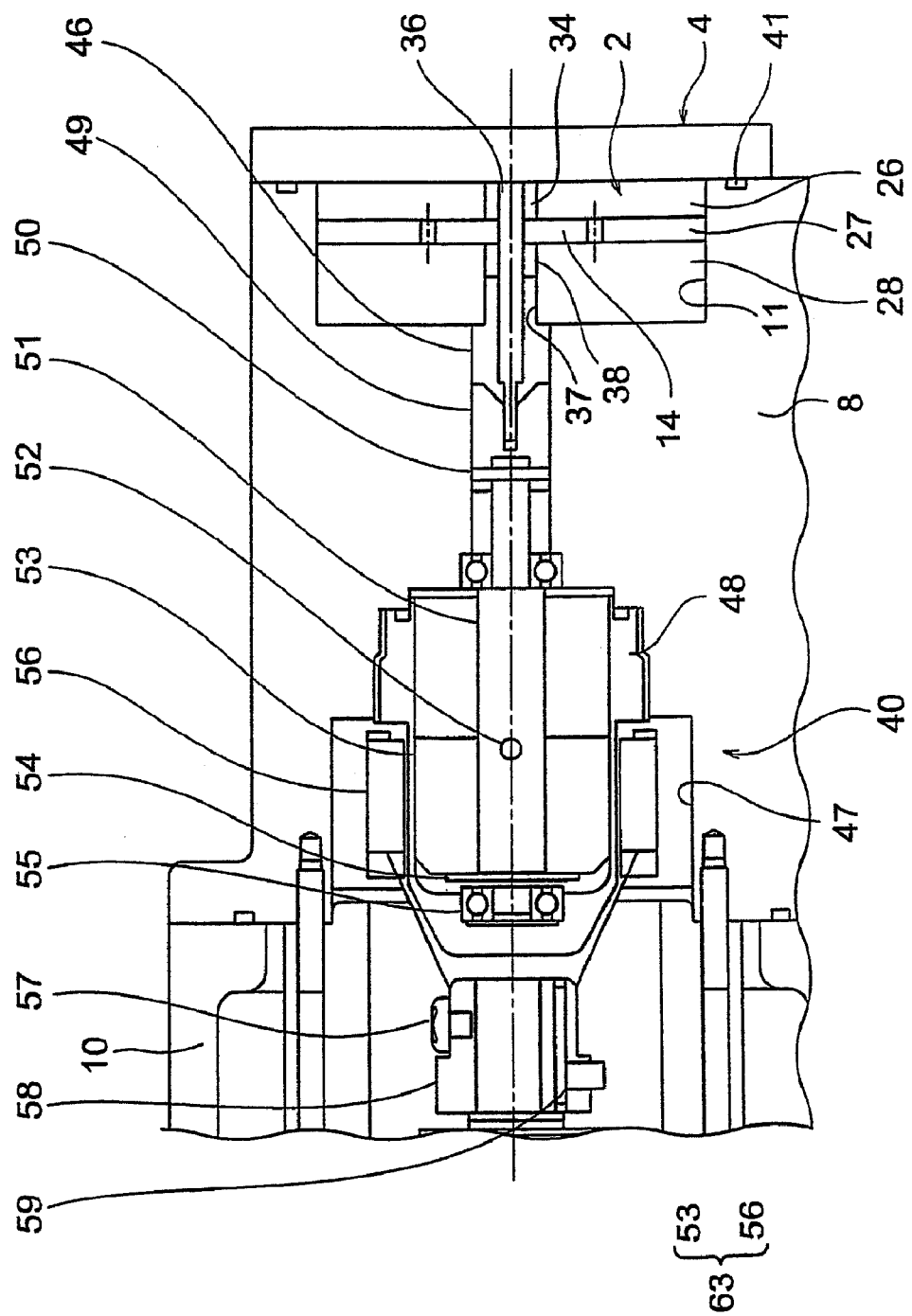
FIG. 7 is an explanatory structural view as seen at a drive position.
Figure 8:
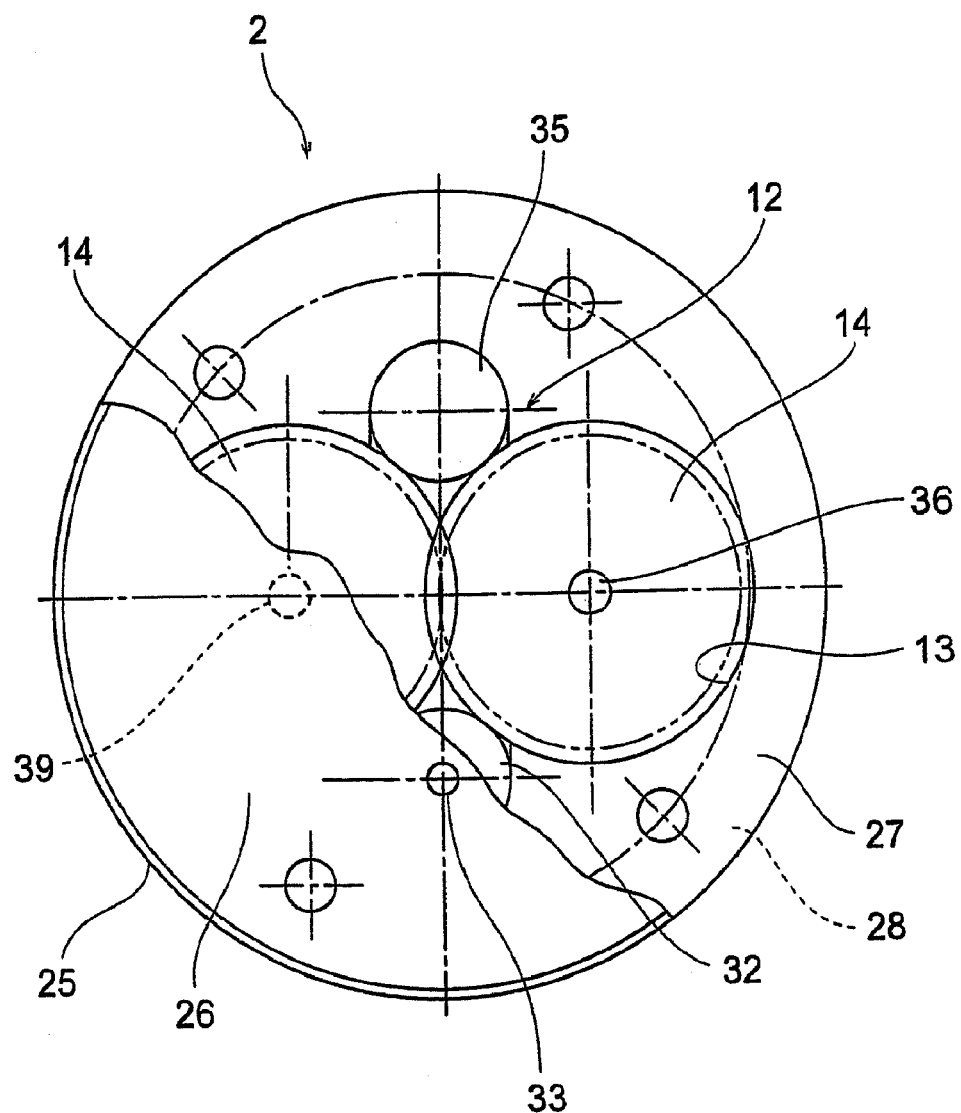
FIG. 8 is an explanatory structural view of a pump unit.
Figure 9:
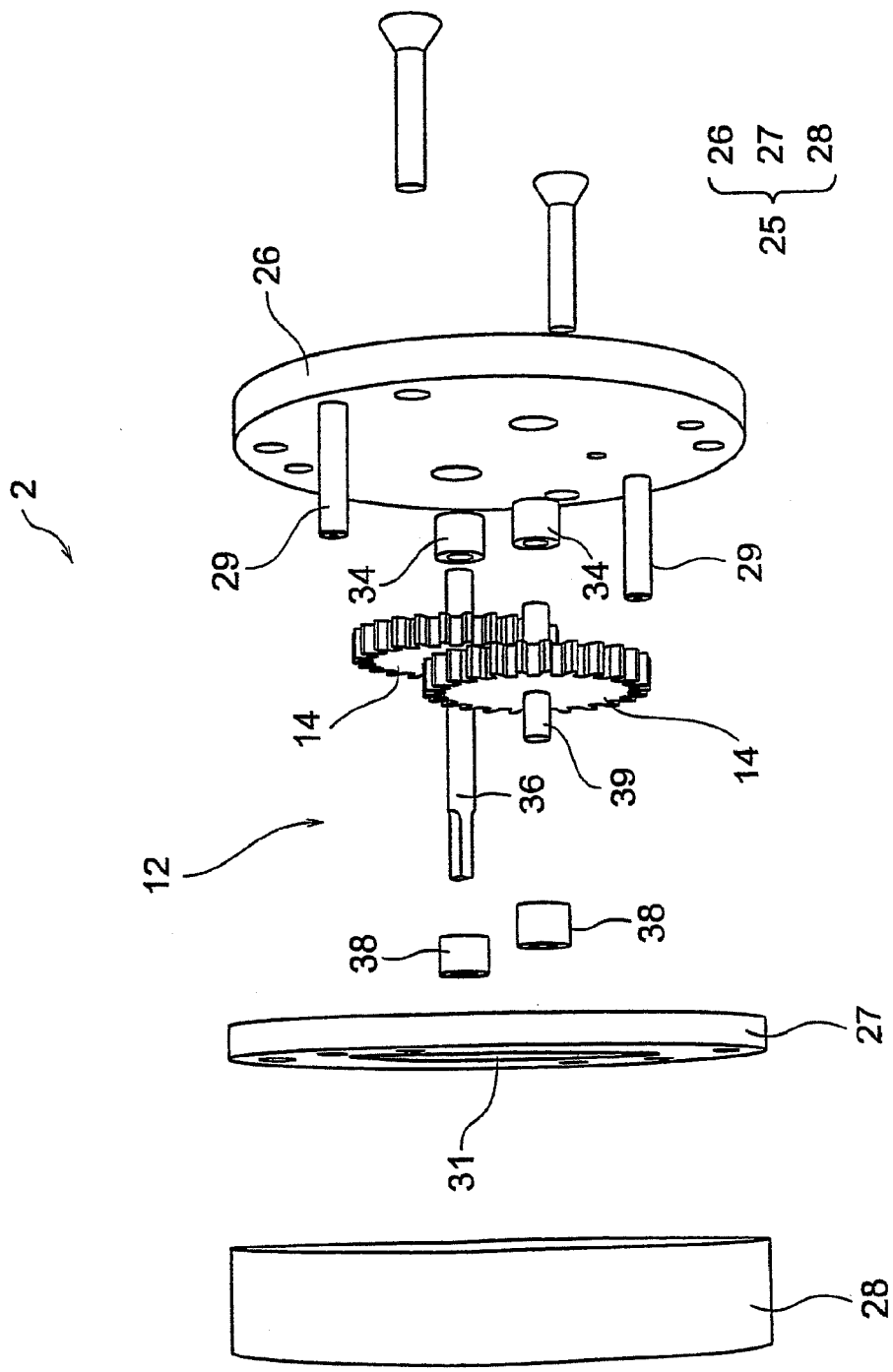
FIG. 9 is an exploded perspective view of the pump unit.
Figure 10:
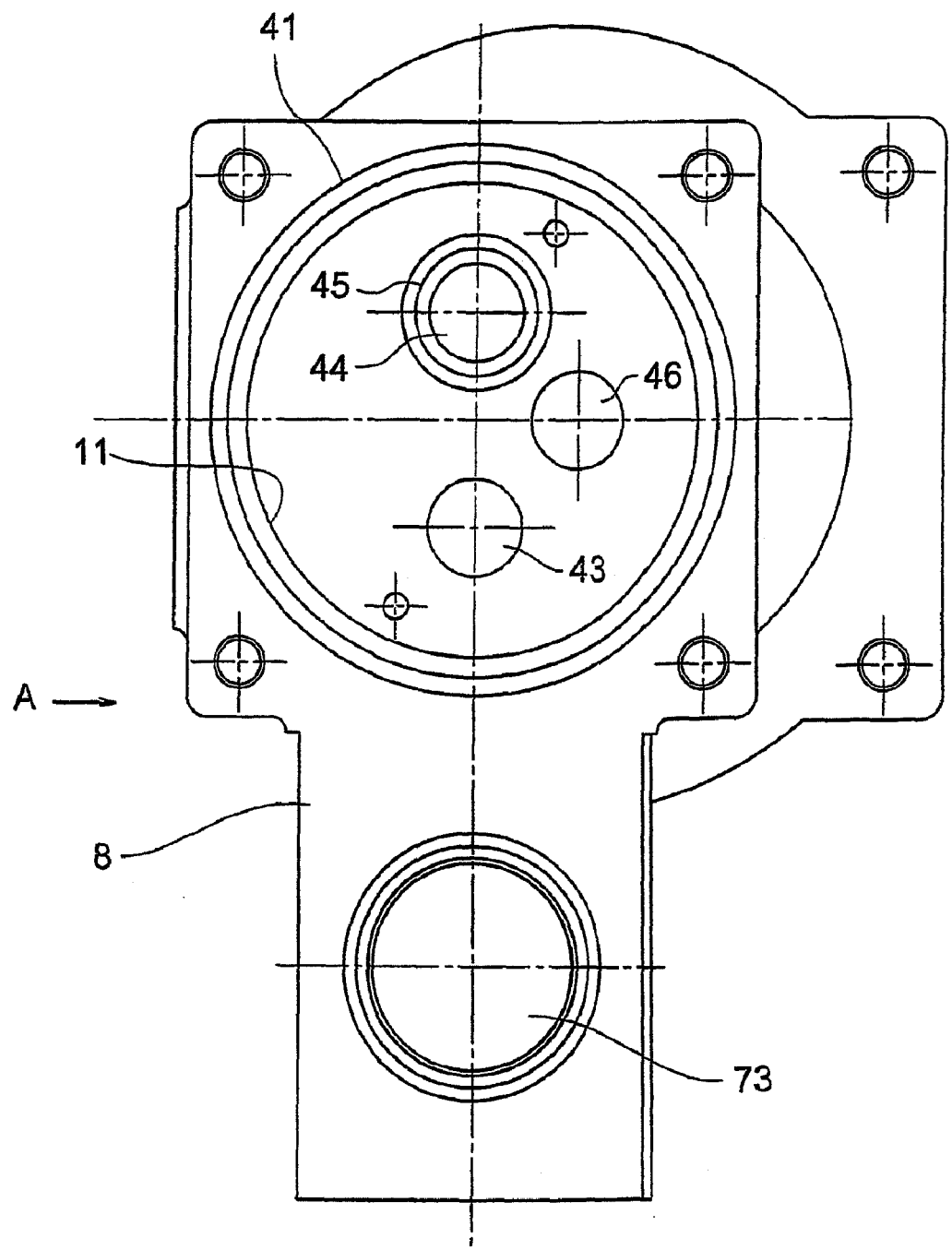
FIG. 10 is a front view of a front side main body casing integrated with a main body casing.
Figure 11:
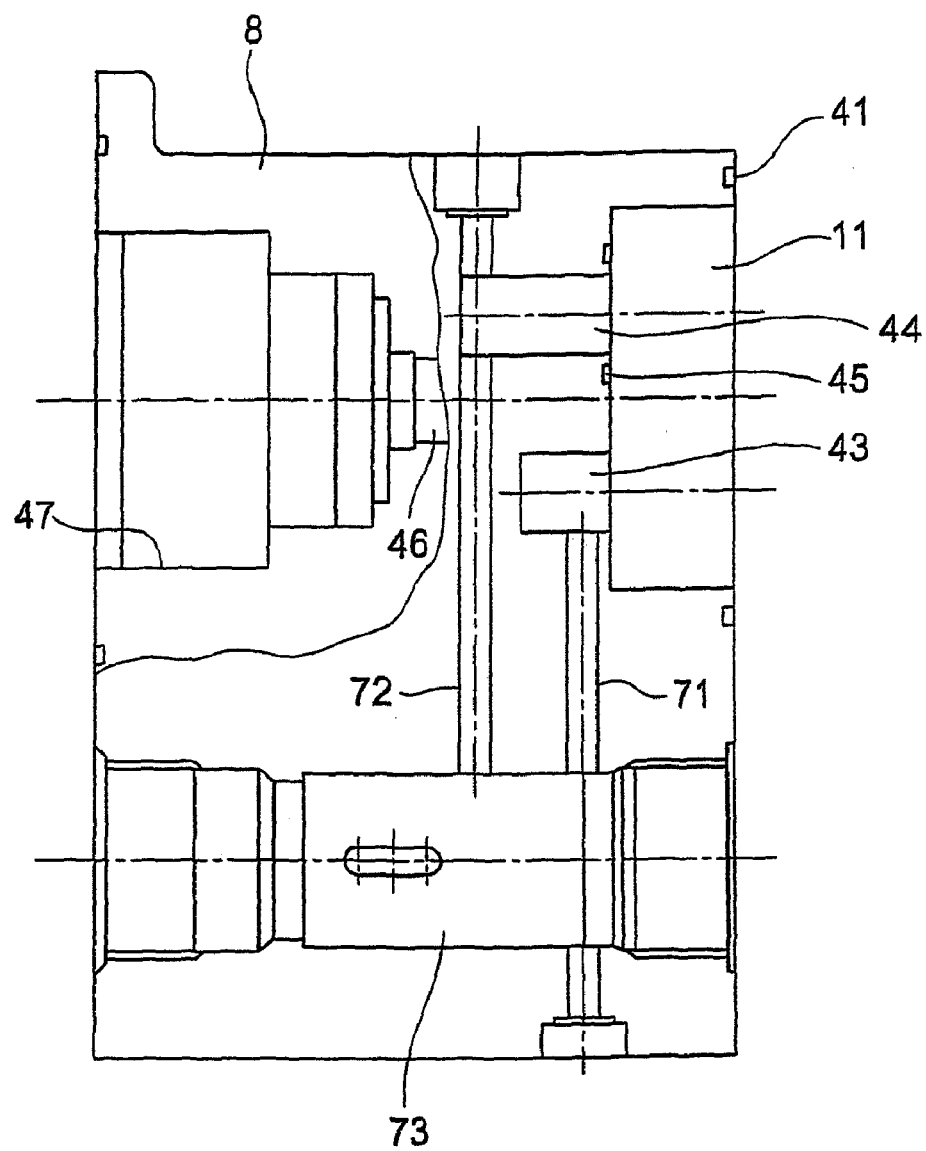
FIG. 11 is a sectional view of the front side main body casing.
Figure 12:
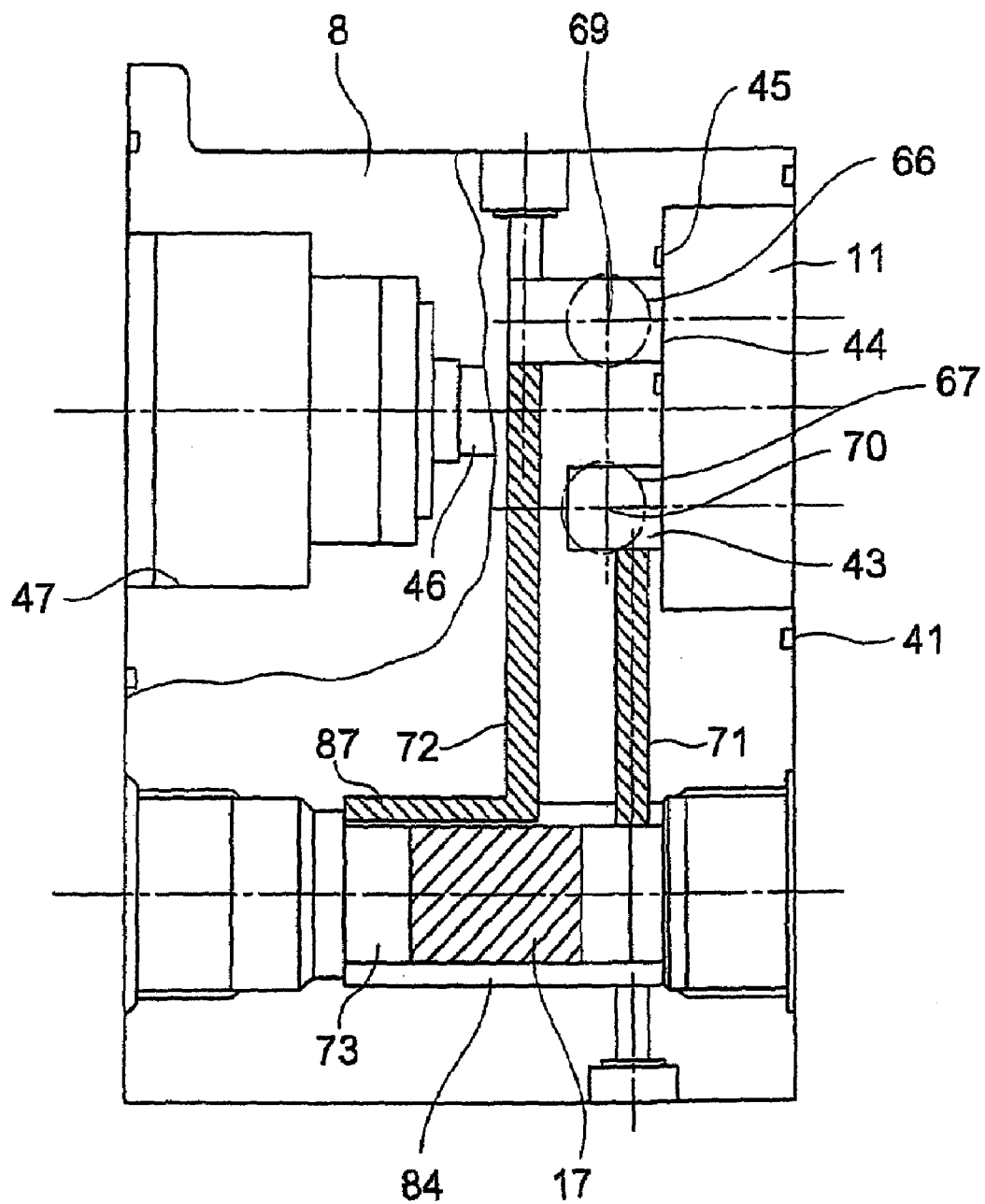
FIG. 12 is a sectional view of the front side main body casing with a pressure guide path formed therein.
Figure 1:
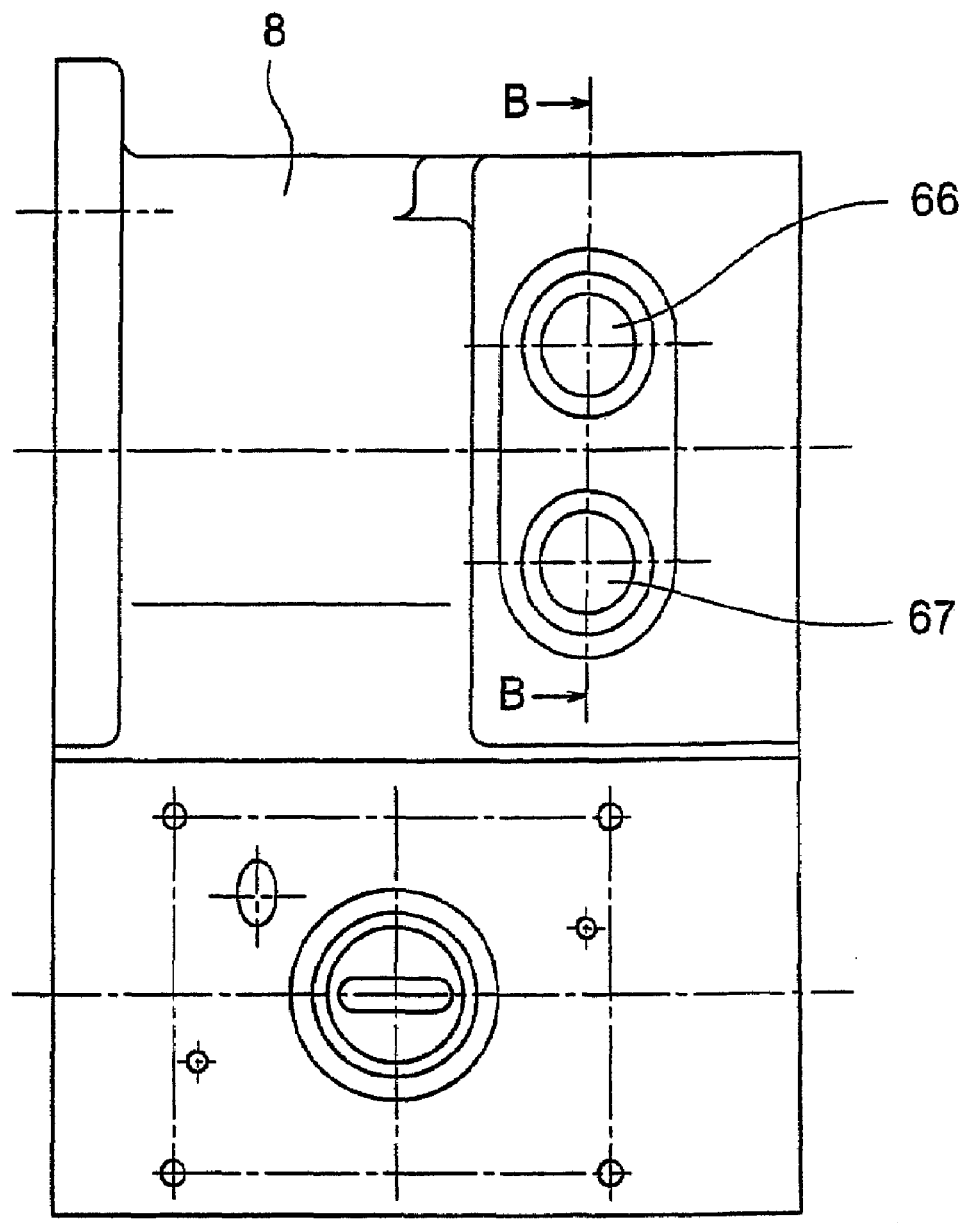
Figure 14:
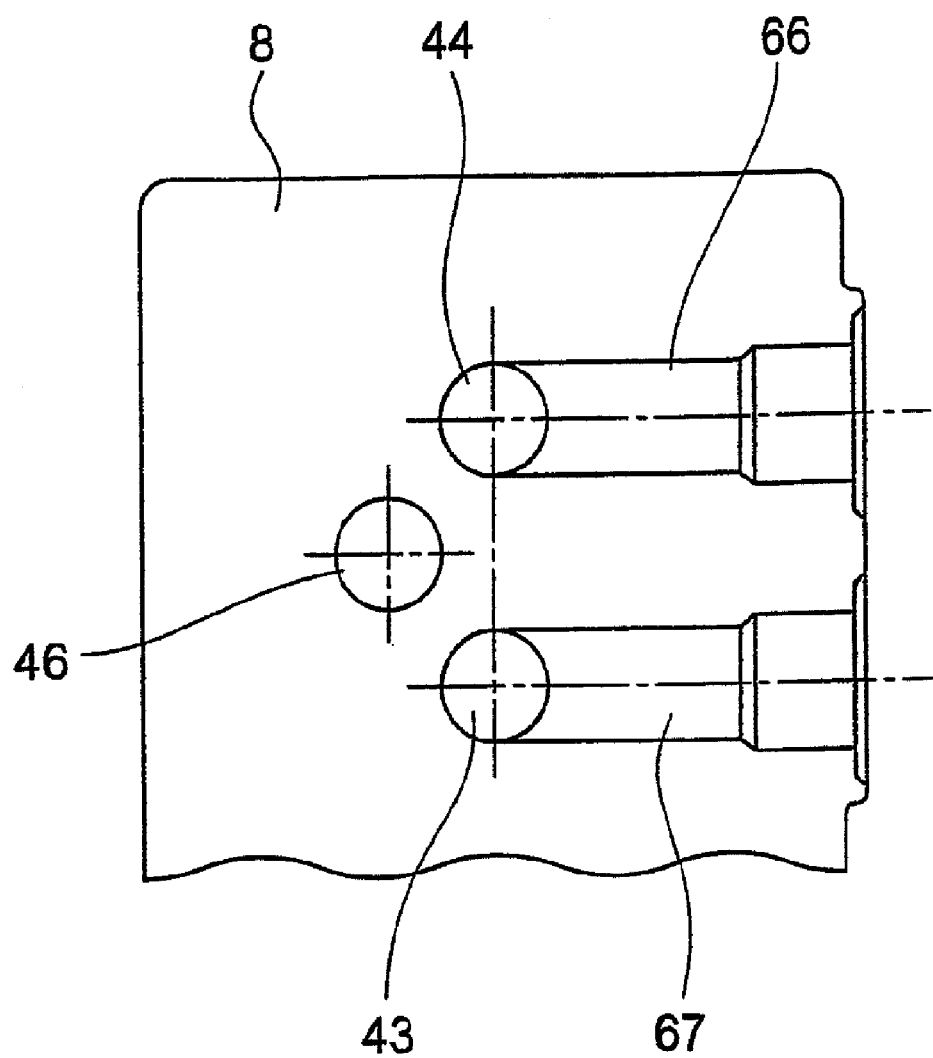
FIG. 14 is a sectional view taken along the line B-B of FIG. 13.
Figure 15:
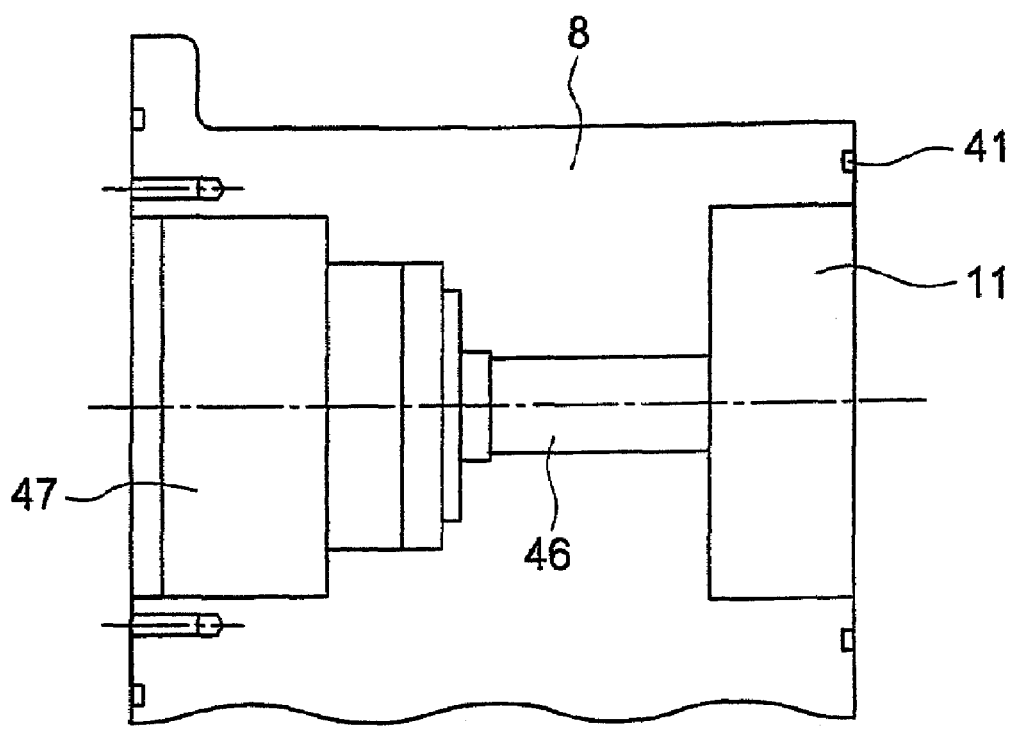
FIG. 15 is a sectional view of the front side main body casing at the drive position.

In the following, the present invention will be described with reference to the drawings. FIG. 1 is a view of a servo type volumetric flowmeter according to an embodiment of the present invention. FIG. 2 is a left-hand side view of the servo type volumetric flowmeter, FIG. 3 is a plan view of the servo type volumetric flowmeter, FIG. 4 is a diagram showing a system configuration, FIG. 5 is an explanatory structural view as seen from the front side, FIG. 6 is an explanatory structural view as seen from the left-hand side, FIG. 7 is an explanatory structural view as seen at a drive position, FIG. 8 is an explanatory structural view of a pump unit, FIG. 9 is an exploded perspective view of the pump unit, FIG. 10 is a front view of a front side main body casing integrated with a main body casing, FIG. 11 is a sectional view of the front side main body casing, FIG. 12 is a sectional view of the front side main body casing with a pressure guide path formed therein, FIG. 13 is a view as seen in the direction of the arrow A in FIG. 10, FIG. 14 is a sectional view taken along the line B-B of FIG. 13, and FIG. 15 is a sectional view of the front side main body casing at the drive position.

In the drawings, the portions that cannot be shown by a simple sectional view are illustrated in a "cutaway" fashion. Regarding the portions shown in "cutaway" illustration, a deviation from strictly accurate positions is involved. Regarding throughout the drawings, the reason for not shading the sections is to avoid difficulty in showing details.

Figure 3:
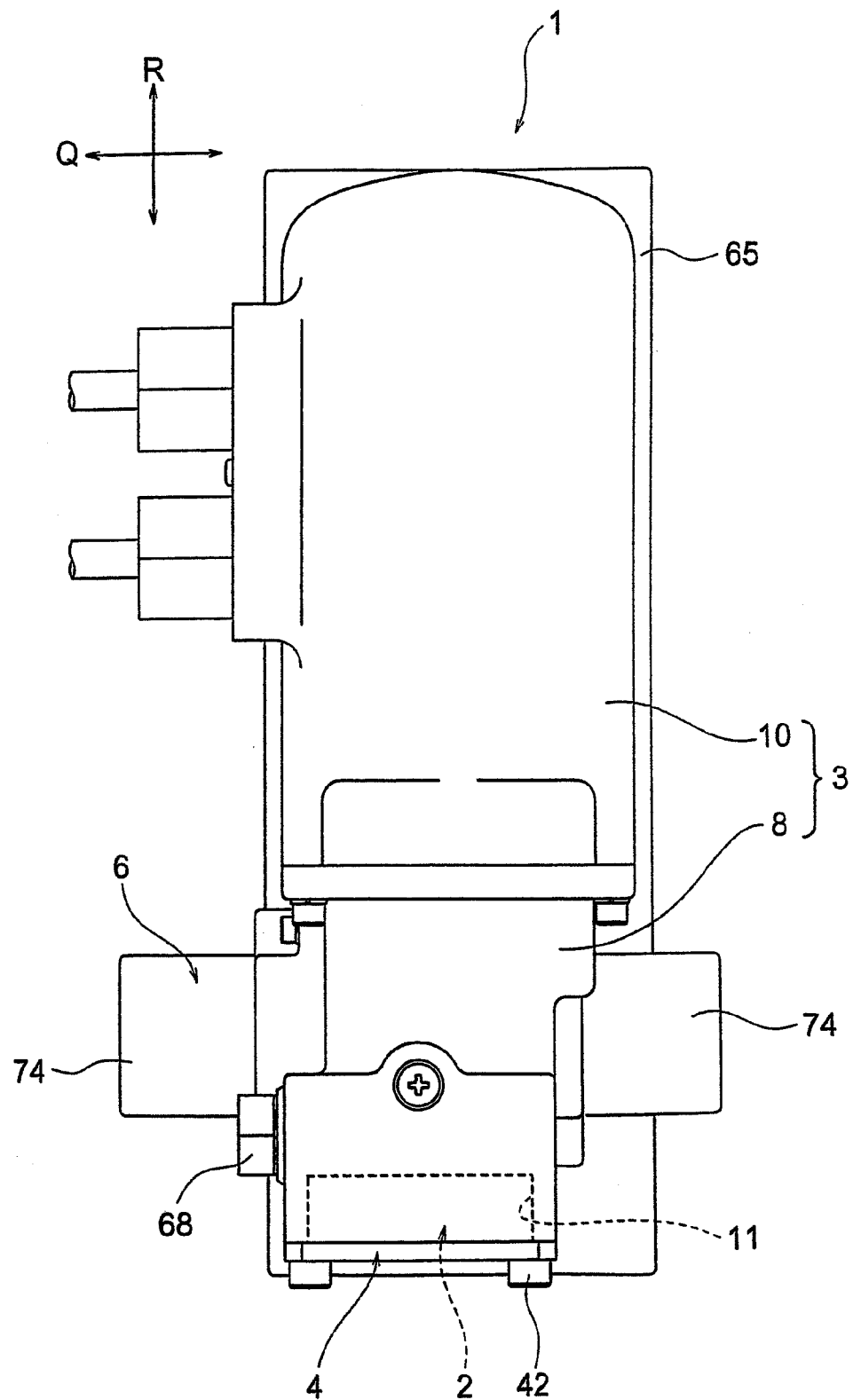
FIG. 3 is a plan view of the servo type volumetric flowmeter.

In FIGS. 1 through 3, reference numeral 1 indicates a servo type volumetric flowmeter according to the present invention (hereinafter referred to simply as volumetric flowmeter 1). The volumetric flowmeter 1 is equipped with a pump unit 2, which is detachable. Further, the volumetric flowmeter 1 has a route structure related to fluid flow and differential pressure detection suitable, in particular, for the case in which the pump unit 2 is provided.

The construction of the volumetric flowmeter 1 will be described more specifically. The volumetric flowmeter 1 is equipped with the pump unit 2 as well as a main body casing 3 for accommodating the pump unit 2 and a cover member 4. Further, as shown in from FIG. 4 onward, the volumetric flowmeter 1 is further equipped with a shaft driving means 5, a differential pressure detecting means 6, and a control means 7.

Here, the arrows of FIGS. 1 through 3 will be illustrated. The arrow P indicates the vertical direction. The arrow Q indicates the horizontal direction, and the arrow R indicates the longitudinal direction. Those directions may or may not coincide with the direction in which the volumetric flowmeter 1 is mounted. (It should be noted, however, that a mounting direction in which piston 17 described below is set vertically is not permissible.)

In FIG. 6, the main body casing 3 is equipped with a front side main body casing 8 having a structure which accommodates the pump unit 2 and integrates the differential pressure detecting means 6, and a rear side main body casing 10 which is connected to the front side main body casing 8 and in which it is possible to mount a servomotor 9 constituting the main body of the shaft driving means 5.

In the front surface of the front side main body casing 8, there is formed a unit accommodating recess 11 for accommodating the pump unit 2. The pump unit 2 is inserted into the unit accommodating recess 11, and is then covered with the cover member 4 to be thereby completely accommodated. By removing the cover member 4, the volumetric flowmeter 1 allows maintenance, replacement or the like of the pump unit 2.

First, the system configuration will be briefly illustrated with reference to FIG. 4. After that, the components will be described with reference to FIGS. 1 through 15.

In FIG. 4, reference numeral 12 indicates a pump portion. The pump portion 12 has a measuring chamber 13 and a pair of rotors 14. The pair of rotors 14 are arranged so as to be engaged with each other, and one of them is driven by the servomotor 9. The differential pressure detecting means 6 has a pair of differential pressure detection pressure guide paths 15 and a differential pressure detecting portion 16. Further, in this case, it has a piston 17, a light emission side photoelectric sensor (light emitting element) 18, and a light reception side photoelectric sensor (light receiving element) 19. The control means 7 has a computation circuit 20, a control circuit 21, and an output circuit 22.

In the above-mentioned construction, the fluid to be measured (which flows from the right to the left in the drawing) entering at an inlet 23 reaches an outlet 24 by way of the pair of rotors 14 of the pump portion 12. On the output side and the input side of the pair of rotors 14 (i.e., on the left-hand side and the right-hand side in FIG. 4), there are provided the pair of differential pressure detection pressure guide paths 15; when a differential pressure is generated, the piston 17 accommodated in the differential pressure detecting portion 16 moves to the right or left. This movement of the piston 17 is observed by the light emission side photoelectric sensor 18 and the light reception side photoelectric sensor 19, and positional information on the piston 17 is transmitted to the computation circuit 20.

In the computation circuit 20, there is generated a signal to be transmitted to the control circuit 21 so as to always keep the differential pressure at zero, in other words, so as to stop the piston 17. The control circuit 21 is adapted to drive the servomotor 9 based on the signal from the computation circuit 20. Transmitted to the control circuit 21 is an encoder signal fed back from the servomotor 9. This encoder signal is transmitted to the output circuit 22, which outputs the encoder signal to the exterior as a flow rate signal (pulse output).

The components of the volumetric flowmeter 1 will be described.

In the pump unit 2, the pump portion 12 is provided inside a pump portion casing 25 (see, for example, FIGS. 8 and 9). The pump portion casing 25 is substantially formed as a cylinder whose thickness in the longitudinal direction is relatively small. In this embodiment, the ease of replacement at the time of flow rate range change is also taken into consideration, so the above-mentioned thickness is set to a fixed level. The substantially cylindrical configuration is given only by way of example. (There are no particular limitations regarding its configuration as long as the formation of pump portion 12 is possible and the attachment/detachment with respect to unit accommodating recess 11 (see FIG. 6) is easy to perform.)

In FIG. 9, the pump portion casing 25 has three circular plates that are separable from each other. In order to give their names from the front side, they are: a cover member side plate 26, a middle plate 27, and a rotor shaft extension side plate 28. Those three plates are stacked together and fixed to each other by a plurality of screws (not indicated by reference numerals).

The pump portion casing 25, constructed as described above, has rearwardly extending positioning pins 29 (the setting of which may be conducted arbitrarily). The positioning pins 29 are provided in order to allow smooth mating when inserting the pump unit 2 into the unit accommodating recess 11 (see FIG. 6) for accommodation.

After positioning thereof at the unit accommodating recess 11, the pump unit 2 is fixed in position by mounting screws 30 passed through the pump portion casing 25 (see FIG. 6).

The main portions of the three plates will be illustrated. The middle plate 27 has a measuring chamber forming portion 31 formed so as to extend therethrough (from the front side to the rear side) in conformity with the configuration of the measuring chamber 13 (see FIG. 8). The middle plate 27 of this embodiment is set to a thickness slightly larger than the thickness of the rotors 14.

The cover member side plate 26 has a flat surface (rear surface) cover the front side opening of the measuring chamber forming portion 31. In the cover member side plate 26, there is formed a pressure guide port 33 (see FIG. 8) extending therethrough so as to be matched with the position of a fluid inflow port 32 described below. The pressure guide port 33 is formed in order to guide a portion of the fluid to be measured entering at the fluid inflow port 32 to the unit accommodating recess 11 (see FIG. 6). On the rear surface of the cover member side plate 26, there are provided two bearings 34 so as to be arranged horizontally side by side at a predetermined interval.

The rotor shaft extension side plate 28 has a flat surface (front surface) covering the rear side opening of the measuring chamber forming portion 31. (When changing the flow rate range, it is possible to recess the front surface to form a part of the measuring chamber forming portion 31. In this case, several types of rotor shaft extension side plate 28 are prepared as replacement components.)

The fluid inflow port 32 and a fluid outflow port 35 which communicate with the measuring chamber forming portion 31, in other words, with the measuring chamber 13, are formed in the rotor shaft extension side plate 28 so as extend therethrough. Further, also extending through the rotor shaft extension side plate 28 is a drive shaft through-hole 37 corresponding to a rearwardly extending rotor shaft 36 described below.

On the front surface of the rotor shaft extension side plate 28, there are provided two bearings 38 so as to be arranged horizontally side by side at a predetermined interval. One of the bearings 38 is provided in the drive shaft through-hole 37 (see FIG. 7). The rotor shaft 36 and a rotor shaft 39 of the rotors 14 are rotatably supported in a center-crank-like fashion by the bearings 38 of the rotor shaft extension side plate 28 and the bearings 34 of the cover member side plate 26.

In FIG. 8, the pump portion 12 has the measuring chamber 13, the pair of rotors 14, and the rotor shafts 36, 39. The pair of rotors 14 are arranged so as to be engaged with each other, and the rotor shaft 36, which is provided on one of the rotors 14 constitutes the drive shaft and extends (rearwards) to the exterior through the drive shaft through-hole 37 (see FIG. 7).

The fluid inflow port 32 and the fluid outflow port 35 are formed to be arranged respectively below and above the engagement portion between the pair of rotors 14. In FIG. 8, the fluid inflow port 32 is on the lower side, and the fluid outflow port 35 is on the upper side. Further, the fluid inflow port 32 and the fluid outflow port 35 are formed so as to be arranged as close as possible to the engagement portion.

The drive shaft through-hole 37 (see FIG. 7) is formed and arranged in conformity with position of the servomotor 9 (see FIG. 6). In this embodiment, the drive shaft through-hole 37 is formed and arranged so that the center thereof is positioned on the center axis of the main body casing 3 (see FIG. 6).

In FIGS. 5, 6, the front side main body casing 8 constituting the main body casing 3 has in the front surface thereof the unit accommodating recess 11 for accommodating the pump unit 2. Further, the front side main body casing 8 has in the left-hand side surface thereof a route portion related to the flow of the fluid to be measured. The route portion related to the flow of the fluid to be measured is formed so as to communicated with the unit accommodating recess 11. Further, the front side main body casing 8 has therebelow a portion for integrating the differential pressure detecting portion 6 therewith. This portion is formed such that the route related to differential pressure detection is continuous with the vicinity of the unit accommodating recess 11. Further, the front side main body casing 8 has on the rear surface thereof a connecting portion for the rear side front body casing 10 and a portion related to a drive force transmitting portion 40 (see FIG. 7). The portion related to the drive force transmitting portion 40 is formed so as to be continuous with the unit accommodating recess 11.

The unit accommodating recess 11 is formed in the front surface of the front side main body casing 8 so as to be a circular recess. On the outer side of the opening edge portion of the unit accommodating recess 11, there is mounted an O-ring 41. To the front side of the front side main body casing 8, there is mounted the cover member 4 so as to cover the opening of the unit accommodating recess 11. The mounting of the cover member 4 is effected by fastening four bolts 42.

In the state in which the cover member 4 has been mounted, the front side main body casing 8 (unit accommodating recess 11) has the function as a pressure container. That is, in the volumetric flowmeter 1, the pump unit 2 itself does not need to have the function of a pressure container. The reason for causing the above-mentioned components to function as a pressure container is to cause a portion of the fluid to be measured to flow into the unit accommodating recess 11 through the pressure guide port 33 (see FIG. 8), bringing also the outer side portion of the pump unit 2 into a wet state with the fluid filling the same. (The fluid pressures applied to the inner and outer sides of the pump unit 2 are equalized.)

At the depth (bottom) of the unit accommodating recess 11, there are formed a first inflow path 43 and a first outflow path 44 so as to be matched with the positions of the fluid inflow port 32 and the fluid outflow port 35, respectively. The first inflow path 43 and the first outflow path 44 are formed as route portions related to the flow of the fluid to be measured. The first inflow path 43 is formed and arranged to be on the lower side, and the first outflow path 44 is formed and arranged to be on the upper side. An O-ring 45 is mounted to the periphery of the opening edge portion of the first outflow path 44 (see FIG. 10). The route portions related to the flow of the fluid to be measured will be described in detail below.

Further, at the depth (bottom) of the unit accommodating recess 11, there is formed a rotor shaft through-hole 46 so as to be matched with the position of the rotor shaft 36 extending from the pump unit 2 (see FIG. 15). The rotor shaft through-hole 46 is formed so as to be continuous with a pressure spacer mounting recess 47 open in the rear surface of the front side main body casing 8 (see FIG. 7). In FIG. 7, in the pressure spacer mounting recess 47, there is provided a pressure spacer 48 in a liquid-tight state (state in which the fluid to be measured is shut off). The unit accommodating recess 11 side and the servomotor 9 side are spaced apart from each other by the pressure spacer 48 (see FIG. 6). The rotor shaft through-hole 46, the pressure spacer mounting recess 47, and the pressure spacer 48 constitute the portion related to the drive force transmitting portion 40.

Here, with reference to FIGS. 6 and 7, the components of the portion related to the drive force transmitting portion 40, etc. will be named. (First, regarding the construction of front side main body casing 8, the components will be named successively starting from unit accommodating recess 11 side, and then the components on servomotor 9 side will be named.) A specific description of their operation, etc. will be omitted.

Reference numeral 49 indicates a shaft coupling. Reference numeral 50 indicates a shaft coupling detent pin. Reference numeral 51 indicates a driven magnet shaft. Reference numeral 52 indicates a driven magnet detent pin. Reference numeral 53 indicates a driven magnet. Reference numeral 54 indicates an E-ring. Reference numeral 55 indicates a ball bearing.

Reference numeral 56 indicates a driving magnet portion. Reference numeral 57 indicates a driving magnet mounting screw. Reference numeral 58 indicates a motor adapter. Reference numeral 59 indicates a motor adapter screw. Reference numeral 60 indicates motor mounting hardware. Reference numeral 61 indicates a reduction gear mounting bolt. Reference numeral 62 indicates a motor portion mounting bolt.

As can be seen from the construction of the portion related to the drive force transmitting portion 40, in this embodiment, the rotor shaft 36 extending from the pump unit 2 is driven by a magnetic coupling 63 formed by the driving magnet portion 56 and the driven magnet 53. In this embodiment, there is adopted a method by which the rotor shaft 36 is driven by using the magnetic coupling 63, so not only is there no fear of liquid leakage, but it is also possible to smoothly rotate the rotor shaft 36.

The servomotor 9 existing at the rear of the portion related to the drive force transmitting portion 40 is mounted so as to be accommodated in a main body mounting portion 64 formed inside the rear side main body casing 10. The rear side main body casing 10 in which the main body mounting portion 64 is formed has an installation base 65 for installing the volumetric flowmeter 1 at a predetermined position, and extends to the portion for integrating the differential pressure detecting means 6 formed below the front side main body casing 8, making it possible to fix the differential pressure detecting means 6 in position.

The route portion related to the flow of the fluid to be measured and the route portion related to the differential pressure detection will be described mainly with reference to FIGS. 10 through 14. First, the route portion related to the flow of the fluid to be measured will be described.

The first outflow path 44 on the upper side is formed such that one end thereof is continuous with the fluid outflow port 35 of the pump unit 2. The first outflow path 44 is formed so as to extend straight rearwards from the depth (bottom) of the unit accommodating recess 11, that is, so as to extend parallel to the axial direction of the rotor shaft 36 extending from the pump unit 2. In order to achieve a reduction in the longitudinal dimension of the volumetric flowmeter 1, the length of the first outflow path 44 is set minimum. In this embodiment, the length is set such that the position of the other end of the first outflow path 44 is on the front side of the central position in the longitudinal direction of the front side main body casing 8.

A first inflow path 43 on the lower side is formed such that one end thereof is continuous with the fluid inflow port 32 of the pump unit 2. The first inflow path 43 is formed so as to extend straight rearwards from the depth (bottom) of the unit accommodating recess 11, that is, so as to extend parallel to the axial direction of the rotor shaft 36 extending from the pump unit 2. Further, the first inflow path 43 is formed so as to be parallel to the first outflow path 44 on the upper side. The first inflow path 43 is formed so as to be somewhat shorter than the first outflow path 44 on the upper side.

The description of the first inflow path 43 and the first outflow path 44 will be summarized. The first inflow path 43 and the first outflow path 44 are open in the size of the fluid inflow port 32 and the fluid outflow port 35, and are parallel to each other while maintaining a fixed distance therebetween. Further, the first outflow path 44 is formed so as to extend somewhat longer rearwards.

A second outflow path 66 is formed so as to be continuous with the first outflow path 44 on the upper side (see FIGS. 12, 14). The second outflow path 66 is formed so as to extend straight in a direction orthogonal to (to the left in this embodiment) with respect to the axial direction of the rotor shaft 36 extending from the pump unit 2. The second outflow path 66 is formed such that one end thereof is continuous with the first outflow path 44 and that the other end thereof is open in the left-hand side surface of the front side main body casing 8. The second outflow path 66 is formed so as to open in the same size as the first outflow path 44. The second outflow path 66 and the first outflow path 44 are formed as substantially L-shaped routes.

A second inflow path 67 is formed so as to be continuous with the first inflow path 43 on the lower side. The second inflow path 67 is formed so as to extend straight in a direction orthogonal to (to the left in this embodiment) with respect to the axial direction of the rotor shaft 36 extending from the pump unit 2. Further, the second inflow path 67 is formed so as to be parallel to the second outflow path 66. The second inflow path 67 is formed such that one end thereof is continuous with the first inflow path 43 and that the other end thereof is open in the left-hand side surface of the front side main body casing 8. The second inflow path 67 is formed so as to open in the same size as the first inflow path 43. The second inflow path 67 and the first inflow path 43 are formed as substantially L-shaped routes.

The description of the second inflow path 67 and the second outflow path 66 will be summarized. The second inflow path 67 and the second outflow path 66 are open in the size of the fluid inflow port 32 and the flow outflow port 35, respectively, and are parallel to each other while maintaining a fixed distance therebetween, extending in the same length to open in the left-hand surface of the front side main body casing 8.

The route portion related to the flow of the fluid to be measured is constituted by the substantially L-shaped route formed by the second outflow path 66 and the first outflow path 44 and the substantially L-shaped path formed by the second inflow path 67 and the fist inflow path 43. A joint 68 is mounted to each of the opening portions of the second outflow path 66 and the second inflow path 67 in the left-hand side surface of the front side main body casing 8. In this embodiment, the first outflow path 44 corresponds to the opening end portion of the outflow path opening in the unit accommodating recess 11. Further, the first inflow path 43 corresponds to the opening end portion of the inflow path opening in the unit accommodating recess 11.

In FIG. 12, a continuation center position 69 of the second outflow path 66 and the first outflow path 44 and a continuation center position 70 of the second inflow path 67 and the first inflow path 43 are set so as to be arranged vertically. In this embodiment, the continuation center position 70 is set in conformity with the other end position of the first inflow path 43. Thus, the first outflow path 44 has some space on the rear side of the continuation center position 69. This space is used for differential pressure detection. This is why the first outflow path 44 is set somewhat longer than the first inflow path 43.

Next, the route portion related to differential pressure detection will be described.

One differential pressure detection pressure guide path 71 (corresponding to differential pressure detection pressure guide path 15 of FIG. 4) is formed so as to be continuous with the first inflow path 43 on the lower side. The one differential pressure detection pressure guide path 71 is formed such that one end thereof is open between the continuation center position 70 of the second inflow path 67 and the first inflow path 43 and one end of the first inflow path 43. One end of the one differential pressure detection pressure guide path 71 has the function of a differential pressure extraction port. The one differential pressure detection pressure guide path 71 is formed so as to extend straightly downwards. The one differential pressure detection pressure guide path 71 is a path for detecting differential pressure, and its diameter is set smaller than that of the first inflow path 43.

The other differential pressure detection pressure guide path 72 (corresponding to differential pressure detection pressure guide path 15 of FIG. 4) is formed so as to be continuous with the first outflow path 44 on the upper side. The other differential pressure detection pressure guide path 72 is formed such that one end thereof is open at a position more spaced apart from the fluid outflow port 35 with respect to the continuation center position 69 of the second outflow path 66 and the first outflow path 44. One end of the other differential pressure detection pressure guide path 72 has the function of a differential pressure extraction port. In this embodiment, the other differential pressure detection pressure guide path 72 is formed in conformity with the end portion position of the first outflow path 44. The other differential pressure detection pressure guide path 72 is formed so as to extend straightly downwards. The other differential pressure detection pressure guide path 72 is formed so as to be parallel to the one differential pressure detection pressure guide path 71. The other differential pressure detection pressure guide path 72 is a path for detecting differential pressure, and its diameter is set smaller than that of the first outflow path 44.

The description of the one differential pressure detection pressure guide path 71 and the other differential pressure detection pressure guide path 72 will be summarized. The one differential pressure detection pressure guide path 71 and the other differential pressure detection pressure guide path 72 are formed so as to be arranged longitudinally side by side at a predetermined interval. Further, the one differential pressure detection pressure guide path 71 is connected on the front side of the continuation center position 70 of the second inflow path 67 and the first inflow path 43, and the other differential pressure detection pressure guide path 72 is connected on the rear side of the continuation center position 69 of the second outflow path 66 and the first outflow path 44. The connecting positions are set aiming at an arrangement of high efficiency for the piston 17, etc. of the differential pressure detecting means 6 (whereby it is advantageously possible to achieve a reduction in the longitudinal dimension of the volumetric flowmeter 1 even if the differential pressure detecting means 6 is integrated with the front side main body casing 8. (For example, if the one differential pressure detection pressure guide path 71 is shifted rearwards, it is necessary to shift the components of the differential pressure detecting means 6 rearwards by this shifting amount, resulting in a rearwardly enlarged structure).)

A differential pressure detecting portion 73 (corresponding to the differential pressure detecting portion 16 of FIG. 4) is formed at the other ends of the one differential pressure detection pressure guide path 71 and the other differential pressure detection pressure guide path 72 so as to be continuous therewith.

Here, the specific components of the differential pressure detecting means 6 and the portions related thereto will be named. A description of their operation, etc. will be omitted. (The description given with reference to FIG. 4 is to be referred to.)

Reference numeral 17 indicates a piston. Reference numeral 18 indicates a light emission side photoelectric sensor. Reference numeral 19 indicates a light emission side photoelectric sensor. Those are basically the same as those shown in FIG. 4.

Reference numeral 74 indicates a photoelectric sensor case (see FIG. 5). Reference numeral 75 indicates a photoelectric sensor mounting plate. Reference numeral 76 indicates photoelectric sensor packing. Reference numeral 77 indicates glass-paned window packing. Reference numeral 78 indicates a photoelectric sensor mounting bolt. Reference numeral 79 indicates tempered glass. Reference numeral 80 indicates a tempered glass O-ring. Reference numeral 81 indicates a photoelectric sensor positioning pin. Reference numeral 82 indicates photoelectric sensor case mounting bolts.

Reference numeral 83 indicates a cylinder front side cover. Reference numeral 84 indicates a sleeve (see FIG. 6). Reference numeral 85 indicates a cylinder cover O-ring. Reference numeral 86 indicates a cylinder rear side cover. The sleeve 84 has a portion 87 matching a part of the other differential pressure detection pressure guide path 72 with the position of the piston 17.

As described above with reference to FIGS. 1 through 15, in the positive displacement flowmeter 1, the path portion related to the flow of the fluid to be measured and the path portion related to the pressure difference detection are formed in special structures. Further, due to the adoption of the structure in which the pressure difference detecting means 6 is integrated with the main body casing 3 (front side main body casing 8), it is possible to achieve a marked improvement over the prior art in terms of precision in pressure difference detection. Further, due to the adoption of such a special structure, it is possible to shorten the positive displacement flowmeter 1 itself in the longitudinal direction.

Apart from this, regarding the effects and the like of the volumetric flowmeter 1, the volumetric flowmeter 1 has a construction in which the pump unit 2 having the pump portion 12 is accommodated in the unit accommodating recess 11 of the main body casing 3 (front side main body casing 8) to be covered with the cover member 4, with the unit accommodating recess 11 and the cover member 4 forming a portion functioning as a pressure container. The pump unit 2 has a construction in which the fluid to be measured flows within the inner space thereof and in which the entire outer space thereof is filled with the fluid to be measured. In the pump unit 2, the fluid pressures applied to the inner and outer side thereof are equalized.

In the volumetric flowmeter 1, it is the cover member 4 functioning, for example, as a pressure container that undergoes temporary deformation due to fluid pressure, and the pump unit 2 itself undergoes no deformation. Thus, the volumetric flowmeter 1 is capable of high precision measurement.

In the volumetric flowmeter 1, there is no need for the pump portion casing 25 of the pump unit 2 to be formed as a pressure container, so it is possible to reduce the wall thickness, for example, of the pump portion casing 25. Thus, the pump unit 2 can be relatively small. (By making the size of the pump unit 2 relatively small, it is also possible to realize a satisfactory workability at the time of replacement.)

Further, in the volumetric flowmeter 1, the rotor shaft 36 is driven through the magnetic joint 63, so not only is there no fear of liquid leakage, but it is also possible to smoothly rotate the rotor shaft 36. Thus, as compared with the prior art, the volumetric flowmeter 1 helps to achieve an improvement in terms of performance and maintenance. (Although there is not yielded such effects, it is also possible to adopt a construction in which driving is effected by using a conventional seal member.)

Further, due to its construction in which the rotor shafts 36, 39 are of a center-crank-like structure, the volumetric flowmeter 1 can stabilize the rotation of the rotors 14. Due to the center-crank-like structure of the rotor shafts 36, 39, there is no need to set the axial length large as in the case of the cantilever-like structure, with the result that it is possible to reduce the size of the pump portion 12.

Further, in the volumetric flowmeter 1, the pump portion casing 25 of the pump unit 2 is formed by three separable plates, one of which can be replaced according to the size of the rotors 14, so it is also possible to take into consideration the ease with which replacement is performed when the flow rate range is changed.

Further, as a matter of course, the present invention allows various modifications without departing from the gist of the present invention.

The invention claimed is:

1. A path structure related to a flow of a fluid to be measured and pressure difference detection in a servo type volumetric flowmeter, comprising:
   an outflow port for the fluid to be measured and an inflow port for the fluid to be measured formed in a metering chamber, the outflow port being above a location where a first rotor and a second rotor engage each other, the inflow port being below the location where the first rotor and the second rotor engage each other, and the second rotor having a rotor shaft;
   a first outflow path extending in an axial direction of the rotor shaft, the first outflow path being formed in a main body casing so as to be continuous with the outflow port for the fluid to be measured;
   a first inflow path extending in the axial direction formed in the main body casing so as to be continuous with the inflow port for the fluid to be measured, the first inflow path being parallel to the first outflow path in the main body casing;
   a second outflow path extending in an orthogonal direction to the axial direction formed in the main body casing so as to be continuous with the first outflow path;
   a second inflow path extending in the orthogonal direction so as to be continuous with the first inflow path and parallel to the second outflow path formed in the main body casing;
   one pressure difference detection connecting path formed in the main body casing, one end of which is open to the first inflow path at a position between a continuation center position of the first inflow path and the second inflow path and the inflow port for the fluid to be measured, and which extends so as not to overlap the second inflow path;
   another pressure difference detection connecting path formed in the main body casing, one end of which is open to the first outflow path at a position farther away from the outflow port for the fluid to be measured with respect to a continuation center position of the first outflow path and the second outflow path, which extends so as not to overlap the second outflow path, and which is parallel to the one pressure difference detection connecting path; and
   a pressure difference detecting portion formed in the main body casing so as to be continuous with the other end of the one pressure difference detection connecting path and with the other end of the other pressure difference detection connecting path.

2. A path structure related to a flow of a fluid to be measured and pressure difference detection in a servo type volumetric flowmeter according to claim 1,
   wherein the second outflow path and the second inflow path are formed so as to extend to left or to right, and
   wherein the one pressure difference detection connecting path and the other pressure difference detection connecting path are formed so as to extend downwards or upwards.

* * * * *